US010198642B2

(12) United States Patent
Belhoula

(10) Patent No.: US 10,198,642 B2
(45) Date of Patent: Feb. 5, 2019

(54) METHOD FOR A MOTOR VEHICLE PROVIDED WITH A CAMERA, DEVICE AND SYSTEM

(71) Applicant: Continental Automotive GmbH, Hannover (DE)

(72) Inventor: Abdelkarim Belhoula, Asslar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/517,114

(22) PCT Filed: Oct. 5, 2015

(86) PCT No.: PCT/EP2015/072952
§ 371 (c)(1),
(2) Date: Apr. 5, 2017

(87) PCT Pub. No.: WO2016/055416
PCT Pub. Date: Apr. 14, 2016

(65) Prior Publication Data
US 2017/0293813 A1    Oct. 12, 2017

(30) Foreign Application Priority Data

Oct. 6, 2014  (DE) .................. 10 2014 220 199

(51) Int. Cl.
*G06K 9/00* (2006.01)
*B60R 1/00* (2006.01)
*G01C 21/36* (2006.01)

(52) U.S. Cl.
CPC ............ *G06K 9/00798* (2013.01); *B60R 1/00* (2013.01); *G01C 21/3658* (2013.01); *G06K 9/00785* (2013.01); *B60R 2300/804* (2013.01)

(58) Field of Classification Search
CPC ............ G06K 9/00785; G06K 9/00798; B60R 2300/804; B60R 1/00; G01C 21/3658
See application file for complete search history.

(56) References Cited

U.S. PATENT DOCUMENTS

| 8,396,299 | B2 * | 3/2013 | Sakurai | ............... G06K 9/00798 |
|---|---|---|---|---|
| | | | | 382/199 |
| 2010/0161192 | A1 * | 6/2010 | Nara | ..................... B60W 10/06 |
| | | | | 701/70 |
| 2011/0010094 | A1 * | 1/2011 | Simon | .................. B60W 30/16 |
| | | | | 701/301 |

(Continued)

FOREIGN PATENT DOCUMENTS

| DE | 10245335 | | 4/2004 | |
|---|---|---|---|---|
| DE | 10245335 | A1 * | 4/2004 | ......... G01C 21/3602 |

(Continued)

*Primary Examiner* — Amara Abdi
(74) *Attorney, Agent, or Firm* — Cozen O'Connor

(57) ABSTRACT

A method for a motor vehicle provided with a camera includes: providing, by the camera, an image representing surroundings of the motor vehicle; detecting at least one line of vehicles in the image; detecting at least one driving lane based on the at least one detected line of vehicles; detecting a state of at least one driving direction display in the image; and detecting a lane topology for the at least one detected driving lane, based on the state of the at least one driving direction display.

8 Claims, 4 Drawing Sheets

(56) References Cited

U.S. PATENT DOCUMENTS

| | | | | |
|---|---|---|---|---|
| 2011/0241930 A1* | 10/2011 | Wood | ............... | G01S 7/12 342/93 |
| 2012/0109521 A1* | 5/2012 | Rothschild | ......... | G01C 21/3658 701/487 |
| 2012/0203452 A1* | 8/2012 | Jacobs | ............... | G01C 21/3658 701/411 |

FOREIGN PATENT DOCUMENTS

| | | | | |
|---|---|---|---|---|
| DE | 102004047081 | | 4/2006 | |
| DE | 102004047081 A1 * | | 4/2006 | ............ B60W 30/16 |
| EP | 2056070 | | 5/2009 | |
| EP | 2056070 A2 * | | 5/2009 | ......... G01C 21/3658 |

* cited by examiner

METHOD FOR A MOTOR VEHICLE PROVIDED WITH A CAMERA, DEVICE AND SYSTEM

CROSS-REFERENCE TO RELATED APPLICATIONS

This is a U.S. national stage of application No. PCT/EP2015/072952, filed on 5 Oct. 2015, which claims priority to the German Application No. 10 2014 220 199.3 filed 6 Oct. 2014, the content of both incorporated herein by reference.

BACKGROUND OF THE INVENTION

1. Field of the Invention

The invention relates to a method for motor vehicle, in particular for detecting driving lanes by a camera. The invention furthermore relates to a device to carry out the method, and a system that includes the device.

2. Related Art

Navigation systems can comprise data relating to the topology of the roads and larger junctions. The topology comprises, in particular, the direction of turning that is planned for a driving lane, i.e., for example a left-turn lane, a straight-ahead lane or a right-turn lane. This information can be displayed to the driver of a motor vehicle in the immediate vicinity of such junctions. The display is conventionally independent of the driving lanes that are actually present and of the vehicle's own position.

SUMMARY OF THE INVENTION

It is an object of the invention to provide a method for a motor vehicle with a camera that permits a precise detection of the surroundings of a motor vehicle. It is, furthermore, desirable to provide a device for a motor vehicle, as well as a system for a motor vehicle, which respectively permit a reliable detection of the environment of the motor vehicle.

According to one aspect of the invention, a method is provided for a motor vehicle with a camera and a corresponding device is provided that is configured to carry out the method.

According to at least one form of embodiment of the invention, an image of the camera is provided, the image representing the surroundings of the motor vehicle. At least one line of vehicles is detected in the image. At least one driving lane is detected depending on the at least one detected line of vehicles. A state of at least one driving direction display is detected in the image. A lane topology is detected for the at least one detected driving lane depending on the state of the at least one driving direction display.

The image of the surroundings of the motor vehicle is detected by the camera. The line of vehicles in the image is detected by image-analysis algorithms. The line of vehicles comprises a plurality of motor vehicles arranged one behind another. For example, a plurality of images following each other in time is provided, and used for the following method steps. In particular, a video signal of the camera is used.

A plurality of lines of vehicles can be detected next to one another in the image. A number of driving lanes is detected depending on the number of lines of vehicles. If a single line of vehicles is detected in the image, it is detected that there is a single driving lane in the surroundings. If, for example, two lines of vehicles are detected in the image, it is detected that there are two driving lanes in the surroundings. In order to detect the lane topology of the driving lanes detected, at least one driving direction display (a so-called flasher) that is represented in the image is evaluated. In operation, the states of a plurality of driving direction displays are evaluated, in accordance with some forms of embodiment. The state can be a left flashing state, a right-flashing state, or a no flashing state. If it is detected for a line of vehicles that a predetermined proportion of the motor vehicles of the line of vehicles are flashing right, the lane topology of the driving lanes is detected as a right-turn lane. If it is detected that a predetermined proportion of the motor vehicles of the line of vehicles are flashing left, the lane topology of the driving lane is detected as a left-turn lane. If no flashing is detected, or if the proportion of flashing vehicles is lower than the predetermined proportion, the lane topology of the driving lane is detected as a straight-ahead lane. A plurality of gradations are possible in accordance with further forms of embodiment. For example, a first value is specified for the proportion which, when undershot, leads to the conclusion of a straight-ahead lane. A second proportion is specified. If a proportion of flashing vehicles is detected that lies between the first and the second specified proportions, it is concluded that a lane topology that provides for both straight-ahead driving and for turning is present. If the second predetermined proportion is exceeded, it is concluded that a turning lane is present.

It is possible by the method to detect the number of driving lanes and the lane topology in the surroundings of the motor vehicle. It is in this way possible to do without additional information obtained, for example, from a database of a navigation system. The detection of the driving lanes is additionally possible even when a lane marking cannot be recognized on the image of the surroundings, for example because the lane marking is covered by heavy traffic. The driving lane is furthermore detected at the time, and not on the basis of data that could be obsolete. If, for example, a driving lane is blocked, or if a driving lane is only opened for use irregularly, this is reliably detected by the method.

An incorrect navigation instruction based on inappropriate data regarding the driving lanes in the surroundings is avoided in this way.

In accordance with further forms of embodiment, an item of information of the camera is provided. A position of the motor vehicle relative to the at least one detected driving lane is detected depending on the camera information. The camera information in particular comprises calibration information of the camera. The camera information comprises, for example, information relating to the objective lens of the camera, the alignment of the camera relative to the motor vehicle and/or the alignment of the camera relative to the motor vehicle. This camera information is taken into account in the evaluation of the image of the camera. It is possible to determine, from image distortions or from an offset of the detected driving lane or further image processing algorithms, the driving lane on which the motor vehicle is located. In the case of multiple driving lanes it is thus possible to determine whether the motor vehicle is on the right-hand driving lane, a central driving lane or the left-hand driving lane.

The information relating to the position of the motor vehicle is taken into account, for example, in the preparation of navigation instructions for a route guidance of a navigation device. It is thus, for example, possible to output precise navigation instructions. In accordance with some forms of embodiment, an item of route information of a planned route is provided for the motor vehicle. A preferred driving lane for the motor vehicle is detected depending on the route information and depending on the detected lane topology. If the route information comprises, for example, the information that it is necessary to turn left at the next junction, it is possible to filter out those driving lanes that are left-turn lanes from the detected lane topology. The detected position of the motor vehicle is here taken into account according to some forms of embodiment. If, for example, it is detected that the motor vehicle is on the right-most driving lane, and that there is a plurality of left-turn lanes, the left-turn lane that is arranged furthest to the right is selected as the preferred driving lane. The motor vehicle thus has to perform the smallest possible number of lane changes. The navigation instruction can, in addition, output the exact number of lane changes. Because the position of the motor vehicle is known, it is known which of the driving lanes in the surroundings of the motor vehicle is the one on which the motor vehicle is located.

In accordance with further forms of embodiment, a nominal lane topology is provided from a database. The nominal lane topology is, for example, provided from the data of a navigation system. The lane topology is detected from the image of the camera depending on the nominal lane topology. It is in this way possible to check the plausibility of the detected lane topology by the nominal lane topology. It is, furthermore, possible, for the nominal lane topology to be updated by the detected lane topology.

In accordance with further forms of embodiment, the position of a lane marking in the surroundings is detected. The at least one driving lane is detected depending on the position of the lane marking. When, in particular, the lane marking is partially visible and only partially covered, it is possible to check the plausibility of the detected driving lane by the detected position of the lane marking. It is thus possible to increase the precision of the detected driving lane. In particular, the position of the lane marking is employed in the detection of the driving lane when the driving lane cannot be clearly detected in the image.

In accordance with a further aspect of the invention, a system for a motor vehicle comprises the device that is configured to carry out the method. The system comprises a navigation device and an output device for outputting navigation instructions that comprise information about a preferred driving lane.

The navigation device for example, a satellite-controlled navigation device, for example a GPS navigation device. The navigation device comprises map data that is used for route guidance. In accordance with a start and a specified destination for the route, navigation instructions comprising, for example, turning at a junction, are thus determined.

The output device is, for example, a graphical output device, in particular a display. Alternatively, or in addition, the output device is an audio output device comprising, in particular, loudspeakers. In operation it is possible for the system to output highly specific navigation instructions. Because, in particular, the precise position of the motor vehicle and the existing driving lanes and their topology are known, a precise navigation instruction for a change of lane, depending on the current position, is possible.

BRIEF DESCRIPTION OF THE DRAWINGS

Further advantages, features and developments emerge from the following examples explained in connection with the figures.

In the drawings.

DETAILED DESCRIPTION OF THE PRESENTLY PREFERRED EMBODIMENTS

Figure 1:
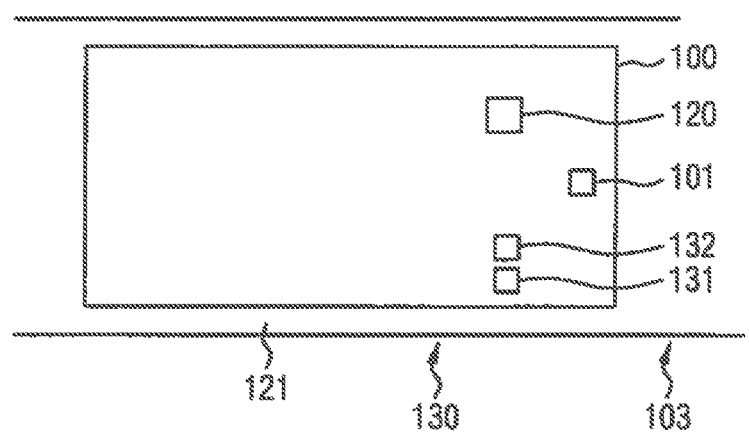
FIG. 1 shows a schematic illustration of a motor vehicle in accordance with some forms of embodiment.

FIG. 1 shows a motor vehicle 100. The motor vehicle 100 is traveling in the surroundings 103 on a road 121.

The motor vehicle comprises a camera 101. The camera 101 is configured to record an image of the surroundings 103. The camera 101 is, in particular, configured to provide a video signal of the surroundings 103. The camera is, for example, arranged in the region of the rear-view mirror on the windshield of the motor vehicle 100. In accordance with further forms of embodiment, the camera is arranged on the roof of the motor vehicle 101. It is, for example, possible for the camera to emerge from the roof of the motor vehicle in order to acquire a better perspective. According to further forms of embodiment, a plurality of cameras 101 are provided, whose images are used. The camera is aligned such that it records the surroundings 103 in front of the motor vehicle.

The motor vehicle 100 comprises a device 120 that evaluates the images of the camera. In accordance with some forms of embodiment, the camera 101 is part of the device 120. In accordance with further forms of embodiment, the camera 101 and the device 120 are separate components. The device 120 is, for example, part of a controller of the motor vehicle 100. The motor vehicle 100 furthermore comprises a navigation device 131 and an output device 132. The navigation device 131 is interconnected for signaling with the device 120, or part of the device 120. In accordance with further forms of embodiment, the device 120 is part of the navigation device 131. The navigation device 131, in particular a satellite navigation system, is configured to determine navigation instructions for a driver of the motor vehicle 100, and to output them by the output device 132. The output device 132 is, in particular, a screen. The device 120, the navigation device 131 and the output device 132 are part of a system 130. In accordance with further forms of embodiment, the camera 101 is also part of the system 130.

Figure 2:
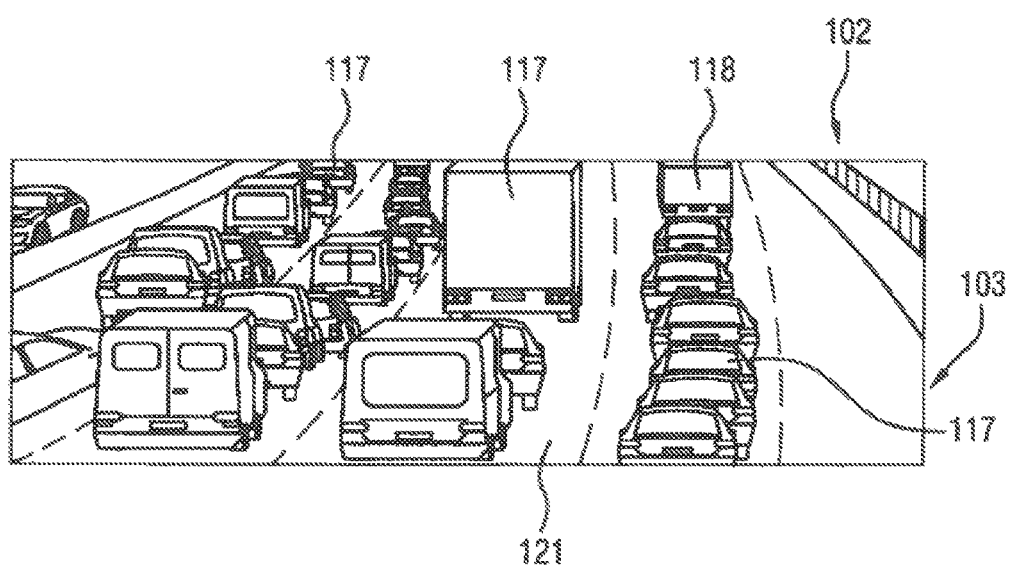
FIGS. 2 to 8 show various stages of the method in accordance with some forms of embodiment.

FIG. 2 shows an image 102 of the surroundings 103 that is recorded by the camera 101. The image 102 shows a representation of the road 121 in front of the motor vehicle 100. The image 102 comprises a plurality of further motor vehicles 117 and 118.

Figure 3:
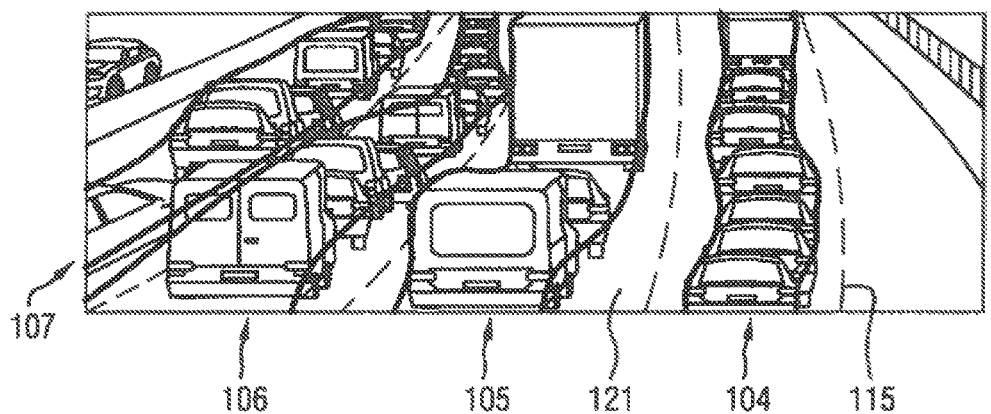

A pattern detection is carried out on the image 102. Lines of vehicles 104, 105, 106 and 107 are detected by the pattern detection (FIG. 3). The lines of vehicles are marked in FIG. 3 by white lines. Motor vehicles lined up behind one another are recognized in the image 102, and are detected by the pattern detection as lines of vehicles 104 to 107. Four lines of vehicles are detected in the exemplary embodiment illustrated. According to further forms of embodiment, more than four or less than four lines of vehicles are detected, depending on how many lines of vehicles the image 102 represents.

According to some forms of embodiment, a lane marking 115 is detected in the image 102 in addition to the lines of vehicles 104 to 107. The lane marking 115 is detected by a separate system according to further forms of embodiment. According to some forms of embodiment, the detection of the lane marking 115 is omitted. In heavy traffic in particular, the lane marking 115 is covered by the further motor vehicles 117 and 118. The detection of the lines of vehicles 104 to 107 is possible without depending on the detection of the lane marking 115.

In order to detect the lines of vehicles 104 to 107, those objects that are moving and those that are not moving in the surroundings 103 are, for example, detected, in particular in the video signal. Objects that move are, for example, recognized as vehicles 117, 118, while non-moving objects are, for example, houses or trees.

Figure 4:
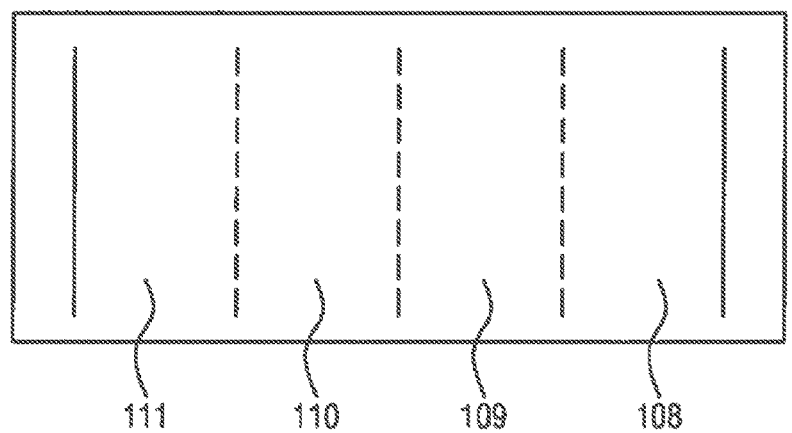

Driving lanes 108, 109, 110 and 111 are detected on the basis of the detected lines of vehicles 104 to 107 (FIG. 4). If four adjacently positioned lines of vehicles 104 to 107 are detected, it is estimated that there are four adjacently positioned driving lanes 108 to 111.

The detection of a lane topology 114 is also possible. The lane topology 114 comprises, in particular, information about the respective direction of travel of the driving lanes 108 to 111. The direction of travel of the driving lanes 108 to 111 is in each case, for example, a right turn lane, a straight-ahead lane or a left-turn lane. A combined straight-ahead and turning lane is also possible.

Figure 5:
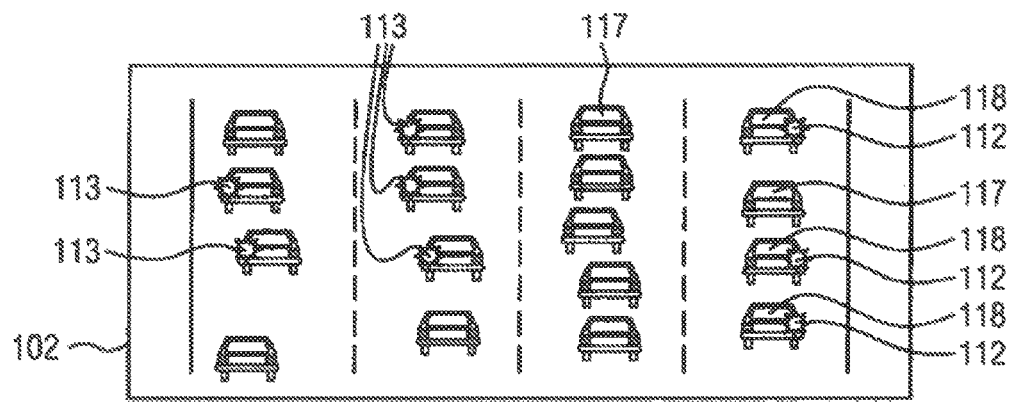

Additional features from the processing of the camera image are employed for the detection of the lane topology 114. The state of the driving direction displays 112, 113 in particular is detected (FIG. 4). The activity of the flashers of the further motor vehicles 117, 118 is detected in the image 102. For example, the state of the driving direction display 112 of the further motor vehicles 118 in FIG. 5 is a right-flashing. The state of the driving direction display 113 is a left-flashing. The further motor vehicles 117 in FIG. 5 are not flashing.

Figure 6:
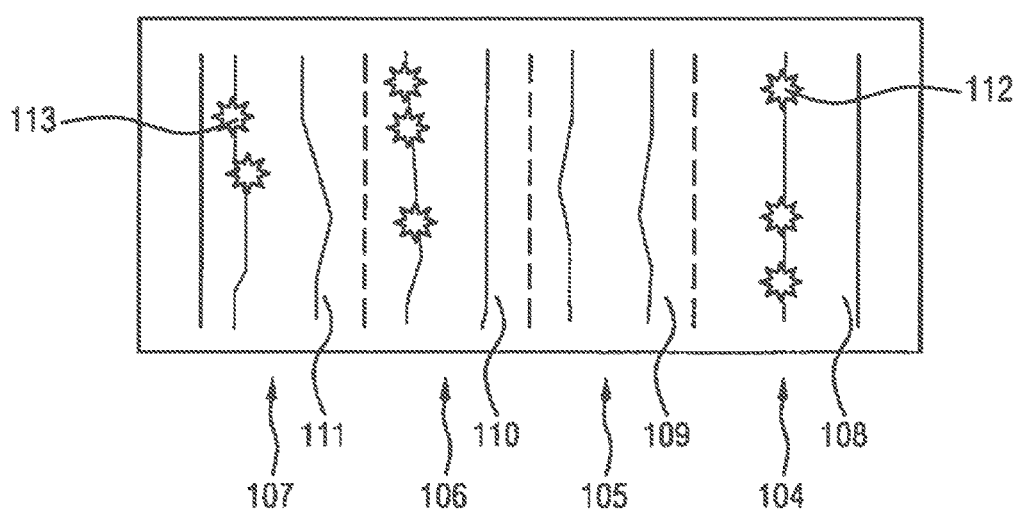

FIG. 6 shows, schematically, an overlay of the flashing pattern detection with the driving lane pattern detection. It is thus possible to distinguish between right-flashing and left-flashing vehicles. It is detected in the line of vehicles 104 that the driving direction displays are flashing on the right-hand side of the line of vehicles 104. Right-flashing is thus detected. It is detected in the lines of vehicles 106 and 107, that the driving direction displays on the left-hand edge of the respective line of vehicles 106 and 107 are flashing. Left-flashing is thus concluded.

Figure 7:
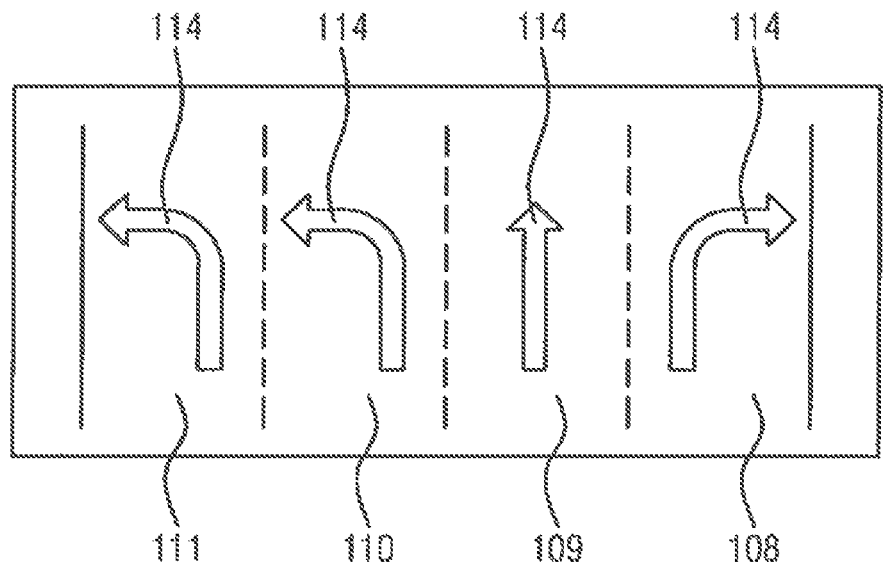

The lane topology 114 is derived from the detection of the driving direction displays 112, 113 and of the detected driving lanes 108 to 111 (FIG. 7). If it is determined for a driving lane 108 that at least a predetermined proportion of the motor vehicles 117, 118 are flashing right, the driving lane is detected as a right-turn lane, which is driving lane 108 in the illustrated exemplary embodiment. If it is determined for a driving lane that at least a predetermined proportion of the further motor vehicles 117, 118 on this driving lane are flashing left, then this driving lane is detected as a left-turn lane. In the illustrated exemplary embodiment, these are driving lanes 110 and 111. The predetermined proportion of flashing vehicles is, for example, 50%. At least half of the motor vehicles 117, 118 on a lane must be flashing for this lane to be detected as a turning lane. According to further forms of embodiment, the proportion is 75% or more, in particular 80% or more. If it is determined for a driving lane that fewer or no motor vehicles on this lane are flashing, this lane is detected as a straight-ahead lane. In the exemplary embodiment illustrated, this is driving lane 105.

Figure 8:
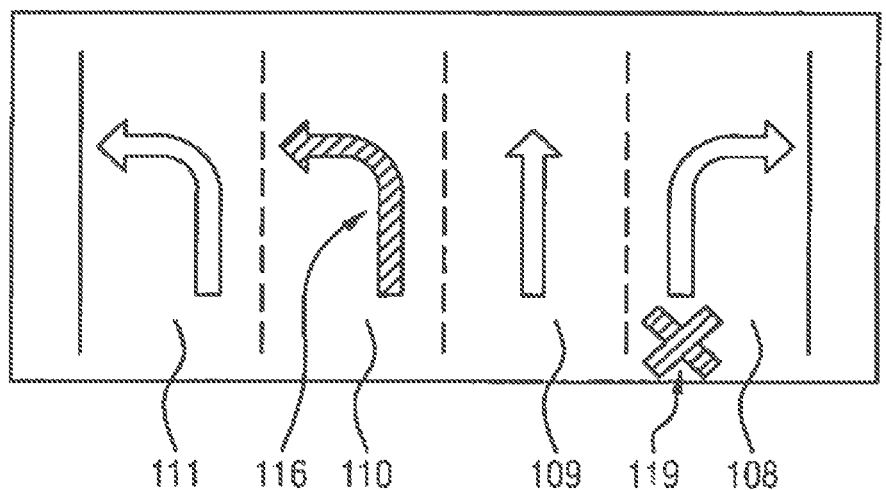

With the aid of information of the camera 101, for example through the objective lens of the camera 101, the relative position of the camera 101 in the motor vehicle 100 and/or calibration information for the camera 101, it is possible to detect a position 119 of the motor vehicle 100 itself in the surroundings 103, in particular on the road 121. It is possible to detect the motor vehicle's own position 119 from the offset in the image 102 of the camera 101. It is thus possible to detect on which of the driving lanes 108 to 111 the motor vehicle 100 is currently located. If, or example, the line of vehicles 104 on the driving lane 108 is detected as relatively straight, and the lines of vehicles 105, 106 and 107 on the further driving lanes 109, 110 and 111 run obliquely, the motor vehicle 100 is probably on driving lane 108. The vehicle's own position 119 is indicated in FIG. 8 by way of example with a cross.

It is possible for the navigation device 131, by the information about the vehicle's own position 119 and the detected driving lanes 108 with the lane topology 114, to output a precise navigation instruction 116 through the output device 132. An image of the detected driving lanes 108 to 111 with the lane topology 114 is, for example, displayed on the output device 132. The preferred driving lane, which is driving lane 110 in the illustrated exemplary embodiment, is particularly emphasized here. The preferred driving lane is detected in particular depending on the current position 119. If a plurality of possible driving lanes 110, 111 are present that are consistent with the specified route, the driving lane which, for example, can be most easily reached is selected as the preferred driving lane. In the illustrated exemplary embodiment, this is the driving lane 110, since it requires the fewest lane changes starting from the current position 119 on the driving lane 100 to the right. According to further exemplary embodiments, the preferred driving lane 110 is, alternatively or in addition, determined with reference to another criterion, for example that of a subsequent navigation instruction.

Through the evaluation of the lines of vehicles 104 to 107, it is possible to detect the driving lanes 108 to 111 and the number of driving lanes, in particular even when the lane marking 115 is covered in heavy traffic. In addition it is possible to use the driving lanes 108 to 111 for navigation instructions, even if no data from a database about the driving lanes is present in the navigation device 131. The lane topology 114 is determined on the basis of the evaluation of the driving direction displays 112, 113. The vehicle own position 119 is detected on the recognized lane pattern of the driving lanes 108 to 111. The detected driving lanes 108 to 111, together with the lane topology 114 and the vehicle's own detected position 119 are combined with the route guidance of the navigation system. This simplifies the lane changing, and makes it more precise. A driver who is driving on the right-hand lane does not necessarily need to change from the far right all the way to the left when he has to turn left. In the case in which a second or third left-turn lane is available, it is sufficient, to change to the nearest turning lane. A possible precise representation for the route guidance is illustrated in FIG. 8, in which the preferred driving lane 110 is graphically emphasized. Alternatively, or in addition, a precise speech output is delivered through the output device 132. For example, instead of the general instruction to "turn left further ahead", the precise navigation instruction "change two lanes to the left, and turn left further ahead" is output. It is thus possible, even in city traffic and in the region of junctions at which the motor vehicles are traveling close behind one another, to detect the driving lanes 104 to 111 and to output precise navigation instructions. Through the fact that the current number of driving lanes 108 to 111 is continuously detected, and the current lane topology 114 is detected, the navigation instructions are prepared on the basis of the current surrounding situation. Incorrect statements based on obsolete information are thus avoided.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for a motor vehicle (100) provided with a camera (101), the method comprising:
   providing, by the camera (101), an image (102) representing surroundings (103) of the motor vehicle (100);
   detecting at least one line of vehicles (104) in the image (102);
   detecting at least one driving lane (108) based on the at least one detected line of vehicles (104);
   detecting a state of at least one driving direction display (112) in the image (102); and
   detecting a lane topology (114) for the at least one detected driving lane (108), based on the state of the at least one driving direction display (112).

2. The method as claimed in claim 1, further comprising:
   providing an item of information of the camera (101); and
   detecting a position (119) of the motor vehicle (100) relative to the at least one detected driving lane (108) based on the camera information.

3. The method as claimed in claim 1, further comprising:
   detecting a displayed direction of the driving direction display based on the at least one detected line of vehicles (104), if an active state of a driving direction display (112) is detected in the image (102).

4. The method as claimed in claim 1, further comprising:
   providing a nominal lane topology from a database; and
   detecting the lane topology based on the nominal lane topology.

5. The method as claimed in claim 1, further comprising:
   detecting a position of a lane marking (115) in the surroundings of the vehicle; and
   the detection of at least one driving lane (108) depending on the position of the lane marking (115).

6. The method as claimed in claim 2, further comprising:
   providing an item of route information of a planned route for the motor vehicle (100); and
   detecting a preferred driving lane (106) for the motor vehicle (100) based on the route information and based on the detected lane topology (114).

7. The method as claimed in claim 6, further comprising:
   the output of navigation instructions depending on the detected position of the motor vehicle (100) and depending on the preferred driving lane (110).

8. A system for a motor vehicle (100), comprising:
   a camera (101) configured to provide an image (102) of the surroundings of the motor vehicle (100);
   a controller (120) configured to evaluate the image from the camera (101);
   a navigation device (131) configured to determine navigation instructions for a driver of the motor vehicle (100); and
   an output device (132) configured to output navigation instructions,
   the controller (120) being configured to:
      detect at least one line of vehicles (104) in the image (102);
      detect at least one driving lane (108) based on the at least one detected line of vehicles (104);
      detect a state of at least one driving direction display (112) in the image (102); and
      detect a lane topology (114) for the at least one detected driving lane (108), based on the state of the at least one driving direction display (112).

* * * * *